(12) United States Patent
Nachenberg

(10) Patent No.: US 8,019,689 B1
(45) Date of Patent: Sep. 13, 2011

(54) DERIVING REPUTATION SCORES FOR WEB SITES THAT ACCEPT PERSONALLY IDENTIFIABLE INFORMATION

(75) Inventor: Carey S. Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 954 days.

(21) Appl. No.: 11/863,110

(22) Filed: Sep. 27, 2007

(51) Int. Cl.
*G06Q 99/00* (2006.01)

(52) U.S. Cl. .......... 705/64; 705/7; 705/50; 705/78; 705/79; 713/150

(58) Field of Classification Search .......... 705/7, 50–79; 713/150
See application file for complete search history.

(56) References Cited

U.S. PATENT DOCUMENTS

| | | | |
|---|---|---|---|
| 7,197,539 B1 | 3/2007 | Cooley | |
| 7,546,349 B1 | 6/2009 | Cooley | |
| 7,587,367 B2 * | 9/2009 | Mengerink | 705/64 |
| 7,783,741 B2 | 8/2010 | Hardt | |
| 7,870,608 B2 | 1/2011 | Shraim et al. | |
| 2002/0046041 A1 | 4/2002 | Lang | |
| 2004/0054661 A1 | 3/2004 | Cheung | |
| 2005/0050335 A1 | 3/2005 | Liang et al. | |
| 2005/0283837 A1 | 12/2005 | Olivier et al. | |
| 2006/0026123 A1 | 2/2006 | Moore et al. | |
| 2006/0085328 A1 | 4/2006 | Cohen et al. | |
| 2006/0212270 A1 | 9/2006 | Shiu et al. | |
| 2006/0212930 A1 | 9/2006 | Shull et al. | |
| 2006/0212931 A1 | 9/2006 | Shull et al. | |
| 2006/0253458 A1 | 11/2006 | Dixon et al. | |
| 2006/0253581 A1 | 11/2006 | Dixon et al. | |
| 2006/0253583 A1 * | 11/2006 | Dixon et al. | 709/225 |
| 2006/0253584 A1 | 11/2006 | Dixon et al. | |
| 2007/0011739 A1 | 1/2007 | Zamir et al. | |
| 2007/0050444 A1 | 3/2007 | Costea et al. | |
| 2007/0107053 A1 | 5/2007 | Shraim et al. | |
| 2007/0124579 A1 | 5/2007 | Haller | |
| 2007/0192855 A1 | 8/2007 | Hulten et al. | |
| 2007/0233782 A1 | 10/2007 | Tali | |
| 2008/0005223 A1 * | 1/2008 | Flake et al. | 709/203 |
| 2008/0028463 A1 | 1/2008 | Dagon et al. | |
| 2008/0104180 A1 | 5/2008 | Gabe | |
| 2008/0109473 A1 | 5/2008 | Dixon et al. | |
| 2008/0109491 A1 * | 5/2008 | Gupta | 707/104.1 |

(Continued)

OTHER PUBLICATIONS

"McAfee SiteAdvisor: What is SiteAdvisor Software?" McAfee®, 2009, [Online] [Retrieved on Jul. 23, 2009] Retrieved from the Internet<URL:http://www.siteadvisor.com/howitworks/index.html>.

(Continued)

*Primary Examiner* — Jalatee Worjloh
(74) *Attorney, Agent, or Firm* — Fenwick & West LLP

(57) ABSTRACT

A reputation server is coupled to multiple clients. Each client has a security module that detects submissions of personally identifiable information (PII) from the client to a web site. The security module reports the identity of the web site and the type of submitted PII to the reputation server. The reputation server computes a reputation score for the web site based on the number and type of PII submissions to it. The reputation score represents an assessment of whether the web site is trustworthy. The reputation server provides the reputation scores for the web site to a client. The security module at the client evaluates the reputation score of the web site and optionally generates an alert advising the user not to submit PII to the web site because the site is untrustworthy.

16 Claims, 7 Drawing Sheets

U.S. PATENT DOCUMENTS

| | | | |
|---|---|---|---|
| 2008/0114709 | A1 | 5/2008 | Dixon et al. |
| 2008/0140820 | A1 | 6/2008 | Snyder et al. |
| 2008/0141366 | A1 | 6/2008 | Cross et al. |
| 2008/0189788 | A1 | 8/2008 | Bahl |
| 2009/0254993 | A1 | 10/2009 | Leone |

OTHER PUBLICATIONS

"StopBadware.org—StopBadware.org Frequently Asked Questions," stopbadware.org, 2009, [Online] [Retrieved on Jul. 23, 2009] Retrieved from the Internet<URL:htto://www.stopbadware.org/home/faq>.

Walsh, K., "Fighting PeertoPeer SPAM and Decoys with Object Reputation," ACM, Aug. 22-26, 2005, pp. 1-6.

International Search Report and Written Opinion, PCT Application No. PCT/US09/48328, Dec. 22, 2010, 8 pages.

Brin, S. et al., "The Anatomy of a Large-Scale Hypertextual Web Search Engine," Computer Networks and ISDN Systems, 1998, pp. 107-117, vol. 30, No. 1-7.

Christodorescu, M. et al., "Semantics-Aware Malware Detection," in Proceedings of the 205 IEEE Symposium on Security and Privacy, IEEE Computer Society, 2005.

Gonzalez, J. et al., "Residual Splash for Optimally Parallelizing Belief Propagation,"Aistats, 2009, 8 pages.

Gyongyi, Z. et al., "Combating Web Spam with Trustrank," Proceedings of the Thirtieth International Conference on Very Large Data Bases, VLDB Endowment, 2004, pp. 576-587, vol. 30.

Idika, N. et al., "A Survey of Malware Detection Techniques," Technical Report, Department of Computer Science, Purdue University, 2007, 48 pages.

Kephart, J. et al., "Automatic Extraction of Computer Virus Signatures," $4^{th}$ Virus Bulletin International Conference, 1994, pp. 178-184.

Kleinberg, J., "Authoritative Sources in a Hyperlinked Environment," Journal of the ACM (JACM), 1999, pp. 604-632, vol. 46, No. 5.

Kolter, J. et al., "Learning to Detect and Classify Malicious Executables in the Wild," The Journal of Machine Learning Research, 2006, p. 2721-2744, vol. 7.

McGlohon, M. et al., "SNARE: A Link Analytic System for Graph Labeling and Risk Detection," Proceedings of the $15^{th}$ ACM SIGKDD International Conference on Knowledge Discovery and Data mining, ACM, 2009, pp. 1265-1274, New York, N.Y.

Neville, J. et al., "Using Relational Knowledge Discovery to Prevent Securities Fraud," Proceedings of the Eleventh ACM SIGKDD International Conference on Knowledge Discovery in Data Mining, ACM, 2005, p. 458.

Neville, J. et al., "Collective Classification with Relational Dependency Networks," Workshop on Multi-Relational Data Mining (MRDM-2003), 2003.

Pandit, S. et al., "NetProbe: A Fast and Scalable System for Fraud Detection in Online Auction Networks," WWW '07, Proceedings of the $16^{th}$ International Conference on World Wide Web, ACM, 2007, pp. 201-210, New York, N.Y.

Pei, J. et al., "On Mining Cross-Graph Quasi-Cliques," Proceedings of the Eleventh ACM SIGKDD International Conference on Knowledge Discovery in Data Mining, ACM, 2005, 11 pages.

Schultz, M. et al., "Data Mining Methods for Detection of New Malicious Executables," IEEE Symposium on Security and Privacy, IEEE Computer Society, 2001, pp. 38-49.

Siddiqui, M. et al., "A Survey of Data Mining Techniques for Malware Detection Using File Features," ACM-SE 46: Proceedings of the $46^{th}$ Annual Southeast Regional Conference on XX, ACM, 2008, pp. 509-510, New York, N.Y.

Symantec Internet Security Threat Report, 36 pages, [Online] [Retrieved on Aug. 8, 2010] Retrieved from the Internet<URL:http://eval.symantec.com/mktginfo/enterprise/white_papers/b-white paper_exec_summary_internet_security_threat_report_xiii_04_2008.en-us.pdf>.

Symantec Malware Definition, [Online] [Retrieved on Aug. 6, 2010] Retrieved from the Internet<URL:http://www.symantec.com/norton/security_response/malware.jsp>.

Symantec Norton Community Watch Privacy Policy, [Online] [Retrieved on Aug. 6, 2010] Retrieved from the Internet<URL:http://www.symantec.com/about/profile/policies/ncwprivacy.jsp>.

Symantec Unveils New Model of Consumer Protection Codenamed "Quorum", 3 pages, [Online] [Retrieved on Aug. 8, 2010] Retrieved from the Internet<URL:https://www.symantec.com/about/news/release/article.jsp?prid=20090706_02>.

Tesauro, G. et al., "Neural Networks for Computer Virus Recognition," IEEE Expert, 1996, pp. 5-6, vol. 11, No. 4.

Tong, H. et al., "Fast Best-Effort Pattern Matching in Large Attributed Graphs," Proceedings of the $13^{th}$ ACM SIGKDD International Conference on Knowledge Discovery and Data Mining, ACM, 2007, 10 pages.

Wang, W. et al., "GraphMiner: A Structural Pattern-Mining System for Large Disk-Based Graph Databases and its Applications," Proceedings of the 2005 ACM SIGMOD International Conference on Management of Data, ACM, 2005, pp. 879-881.

Weaver, N. et al., "A Taxonomy of Computer Worms," Proceedings of the 2003 ACM Workshop on Rapid Malcode, ACM, 2003, pp. 11-18, New York, N.Y.

Yan, X. et al., "gSpan: Graph-Based Substructure Pattern Mining," Proceedings of the 2002 IEEE International Conference on Data Mining (ICDM '02), 2002, 4 pages.

Yan, X. et al., "Mining Closed Relational Graphs with Connectivity Constraints," Proceedings of the Eleventh ACM SIGKDD International Conference on Knowledge Discovery in Data Mining, ACM, 2005, p. 333.

Yedidia, J. et al., "Understanding Belief Propagation and its Generalizations," Exploring Artificial Intelligence in the New Millennium, 2003, pp. 236-239, vol. 8.

Zeng, Z. et al., "Coherent Closed Quasi-Clique Discovery from Large Dense Graph Databases," Proceedings of the $12^{th}$ ACM SIGKDD International Conference on Knowledge Discovery and Data Mining, ACM, 2006, 6 pages.

Zhu, X., "Semi-Supervised Learning with Graphs," 2005, 174 pages.

"TrustedSource™: the Next-Generation Reputation System White Paper," Secure Computing Corporation, Oct. 2006, 6 pages.

Walsh, L., "Careful, Trend Micro Might Give You a Bad Web Reputation," ChannelWeb Network, Mar. 26, 2007, [online] [Retrieved on Jun. 21, 2007] Retrieved from the Internet<URL:http://www.v3.crn.com/security/198500632>.

\* cited by examiner

DERIVING REPUTATION SCORES FOR WEB SITES THAT ACCEPT PERSONALLY IDENTIFIABLE INFORMATION

BACKGROUND OF THE INVENTION

1. Field of the Invention

This invention pertains in general to computer security and in particular to assessing risks presented when providing personally identifiable information to a web site.

2. Description of the Related Art

Users are frequently required to submit personally identifiable information (PII) to web sites on the Internet. For example, users often provide usernames and passwords to web sites that provide ecommerce services, such as auction, banking, and travel-related services. Depending upon the sites, the users may also provide other types of PII such as credit card numbers, social security numbers, and the like.

Malicious attackers will establish web sites on the Internet for the purpose of surreptitiously collecting PII to enable identify theft and other crimes. One common technique is to set up a "phishing" web site that resembles a popular web site. The malicious attacker tricks the user into submitting the PII to the phishing site instead of the real site. Other web sites, while not malicious per se, may have lax security practices or other factors that make the sites untrustworthy.

In view of these risks, security software vendors try to prevent users from providing PII to untrustworthy web sites. However, identifying such sites is a difficult problem. Some vendors use whitelists of known trustworthy web sites to prevent users from submitting PII to sites not on the list. Other vendors, in contrast, use blacklists of known untrustworthy web sites to prevent users from submitting PII to sites on the list. These lists are expensive to maintain and can rapidly become outdated as new sites emerge. Some security software vendors use heuristics to identify untrustworthy sites. However, malicious attackers can defeat the heuristics, and the heuristics occasionally generate false positive detections of untrustworthy sites. Accordingly, the problems associated with malicious and/or untrustworthy web sites are ongoing.

BRIEF SUMMARY

The above and other problems are addressed by a method, computer-implemented system, and computer program product that provide security to a client. An embodiment of the method of providing computer security comprises receiving data describing personally identifiable information (PII) submitted to a web site by a plurality of clients. The method computes a reputation score for the web site based at least in part on the data describing the PII submitted to the web site by the plurality of clients, where the reputation score represents an assessment of the trustworthiness of the web site. The method provides the reputation score to a client.

An embodiment of a computer-implemented system for providing computer security to a plurality of clients comprises a computer processor and a computer-readable storage medium storing computer program modules configured to execute on the computer processor. The computer program modules comprise a communication module configured to receive data describing personally identifiable information (PII) submitted to a web site by a plurality of clients and to provide a computed reputation score for the web site to the clients. The modules further comprise a reputation computation module configured to compute the reputation score for the web site based at least in part on the data describing the PII submitted to the web site by the plurality of clients. The reputation score represents an assessment of the trustworthiness of the web site.

An embodiment of the computer program product has a computer-readable storage medium storing computer-executable code for providing computer security to a client. The code comprises a communication module configured to receive, from a reputation server on a network, a reputation score for a web site on the network. The reputation score represents an assessment of the trustworthiness of the web site and is computed based at least in part on data describing personally identifiable information (PII) submitted to the web site by a plurality of clients. The code further comprises an alert generation module configured to analyze the reputation score for the web site to determine whether the web site is trustworthy and, responsive at least in part to a determination that the web site is not trustworthy, generate an alert at the client indicating that the web site is not trustworthy.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
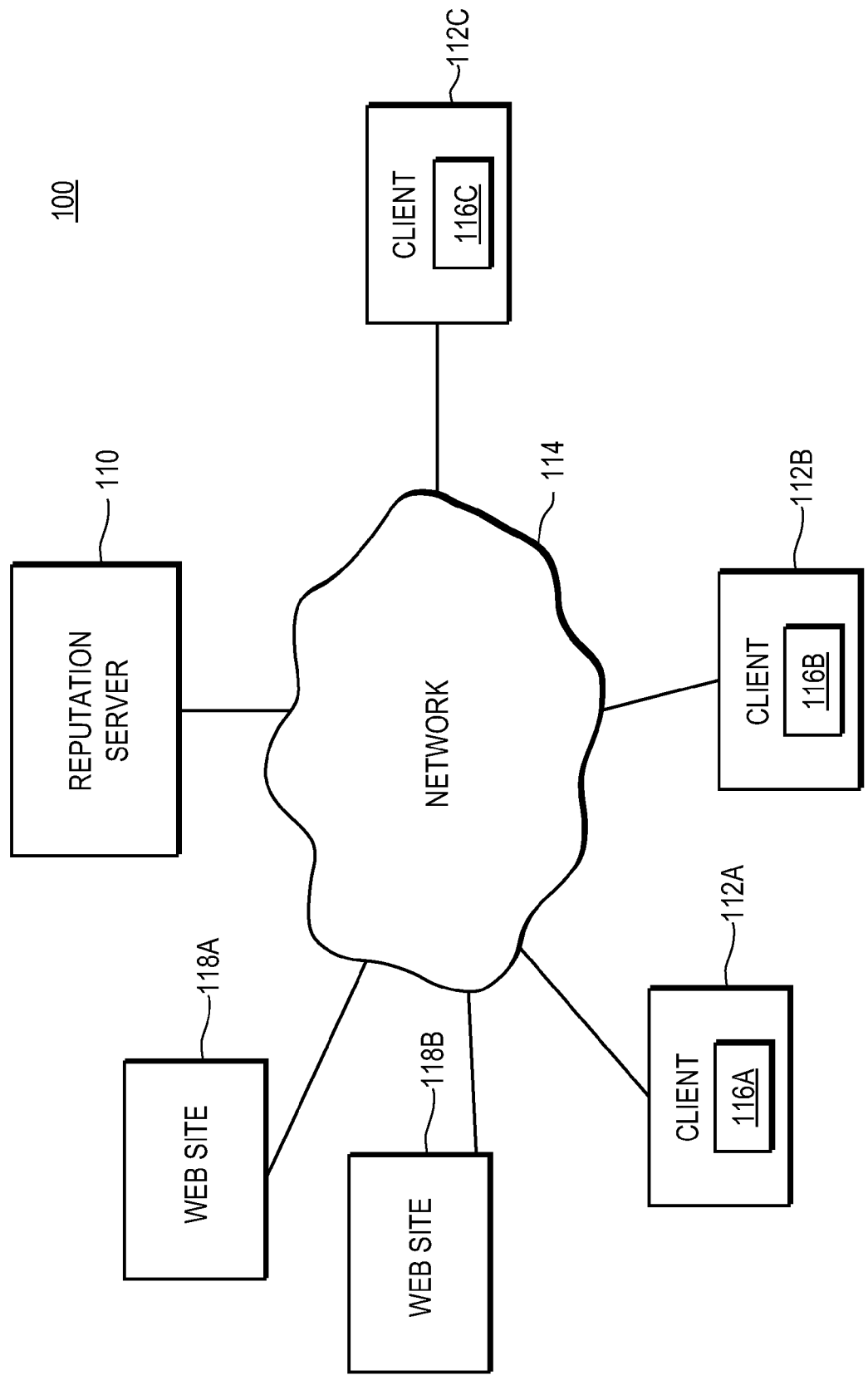
FIG. 1 is a high-level block diagram of a computing environment according to one embodiment.

FIG. 1 is a high-level block diagram of a computing environment 100 according to one embodiment. FIG. 1 illustrates a reputation server 110 and three clients 112 connected by a network 114. Two web sites 118 are also connected to the network 114. Only three clients 112 and two web sites 118 are shown in FIG. 1 in order to simplify and clarify the description. Embodiments of the computing environment 100 can have thousands or millions of clients 112 and/or web sites 118 connected to the network 114.

FIG. 1 and the other figures use like reference numerals to identify like elements. A letter after a reference numeral, such as "112A," indicates that the text refers specifically to the element having that particular reference numeral. A reference numeral in the text without a following letter, such as "112," refers to any or all of the elements in the figures bearing that reference numeral (e.g. "112" in the text refers to reference numerals "112A," "112B," and/or "112C" in the figures).

A web site 118 includes a collection of one or more web pages stored on a web server. A web site 118 is identified by its uniform resource locator (URL), and the browser on the client 112 uses the URL to download a web page from the site via the network 114. The web page can include forms or other functionality that allows a user of the client 112 to submit PII to the site 118. Personally identifiable information, as used herein, includes any piece of information which can potentially be used to uniquely identify, contact, or locate a single person. Personally identifiable information can include confidential and public information. For example, PII can include a person's full name, national identification number (e.g., social security number), telephone number, street address, e-mail address, credit card number, and web site login identification.

The reputation server 110 interacts with the clients 112 via the network 114. In one embodiment, the reputation server 110 receives information from the clients 112 describing web sites 118 to which the clients submitted PII. The reputation server 110 uses the information from the clients 112 to compute a reputation score for a web site 118. The reputation score represents an assessment of the trustworthiness of the web site 118, with a high reputation score indicating that the web site is very trustworthy. "Trustworthiness" in this context refers to whether the web site 118 can be trusted to maintain the PII in confidence and not use it for malicious or improper purposes. In one embodiment, a web site 118 receives a high reputation score if it receives PII from many different clients 112. Conversely, a web site 118 receives a low reputation score if few clients 112 have provided PII to it and/or the site is new. In some embodiments the reputation scores also depend upon other factors, such as the types of PII that clients provide to the web sites 118. A web site 118 can have different reputation scores with respect to different types of PII. The reputation server 110 provides the reputation scores for the web sites 118 to the clients 112, and the clients (and users of the clients) use the scores to guide behaviors with respect to whether to provide PII to the sites.

In one embodiment, a client 112 is a computer used by one or more users to perform activities including browsing and providing PII to web sites 118 on the network 114. The client 112, for example, can be a personal computer executing a web browser such as MICROSOFT INTERNET EXPLORER that allows the user to retrieve and display content from web sites 118 and other computers on the network 114. In other embodiments, the client 112 is a network-capable device other than a computer, such as a personal digital assistant (PDA), a mobile telephone, a pager, a television "set-top box," etc.

In one embodiment, the client 112 executes a security module 116 that monitors the state of the client and detects activities involving PII. The security module 116 detects when the user submits PII to a web site 118 and sends a report to the reputation server 110 describing the web site and type of PII submitted. In addition, the security module 116 receives information from the reputation server 110 describing reputation scores for web sites 118 visited by the client 112 and generates alerts if the user attempts to submit PII to a site having a low reputation score. Embodiments of the security module 116 also generate alerts in other situations.

Using reputation scores in this manner leverages the users' collective decisions on whether to submit PII to web sites 118 to evaluate the trustworthiness of the sites. If many users determine that it is safe to provide PII to a given web site 118, the web site is probably trustworthy. On the other hand, if only a few users provide PII to a given web site, the web site might be a phishing site or other type of untrustworthy site.

This approach is well-suited to a computing environment where there is a large and constantly changing set of web sites 118 and it is not practical or effective to use whitelists, blacklists, and/or certain heuristics to track the trustworthiness of the sites.

The network 114 represents the communication pathways between the reputation server 110, clients 112, and web sites 118. In one embodiment, the network 114 is the Internet. The network 114 can also utilize dedicated or private communications links that are not necessarily part of the Internet. In one embodiment, the network 114 uses standard communications technologies and/or protocols. Thus, the network 114 can include links using technologies such as Ethernet, 802.11, integrated services digital network (ISDN), digital subscriber line (DSL), asynchronous transfer mode (ATM), etc. Similarly, the networking protocols used on the network 114 can include the transmission control protocol/Internet protocol (TCP/IP), the hypertext transport protocol (HTTP), the simple mail transfer protocol (SMTP), the file transfer protocol (FTP), etc. The data exchanged over the network 114 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Figure 2:
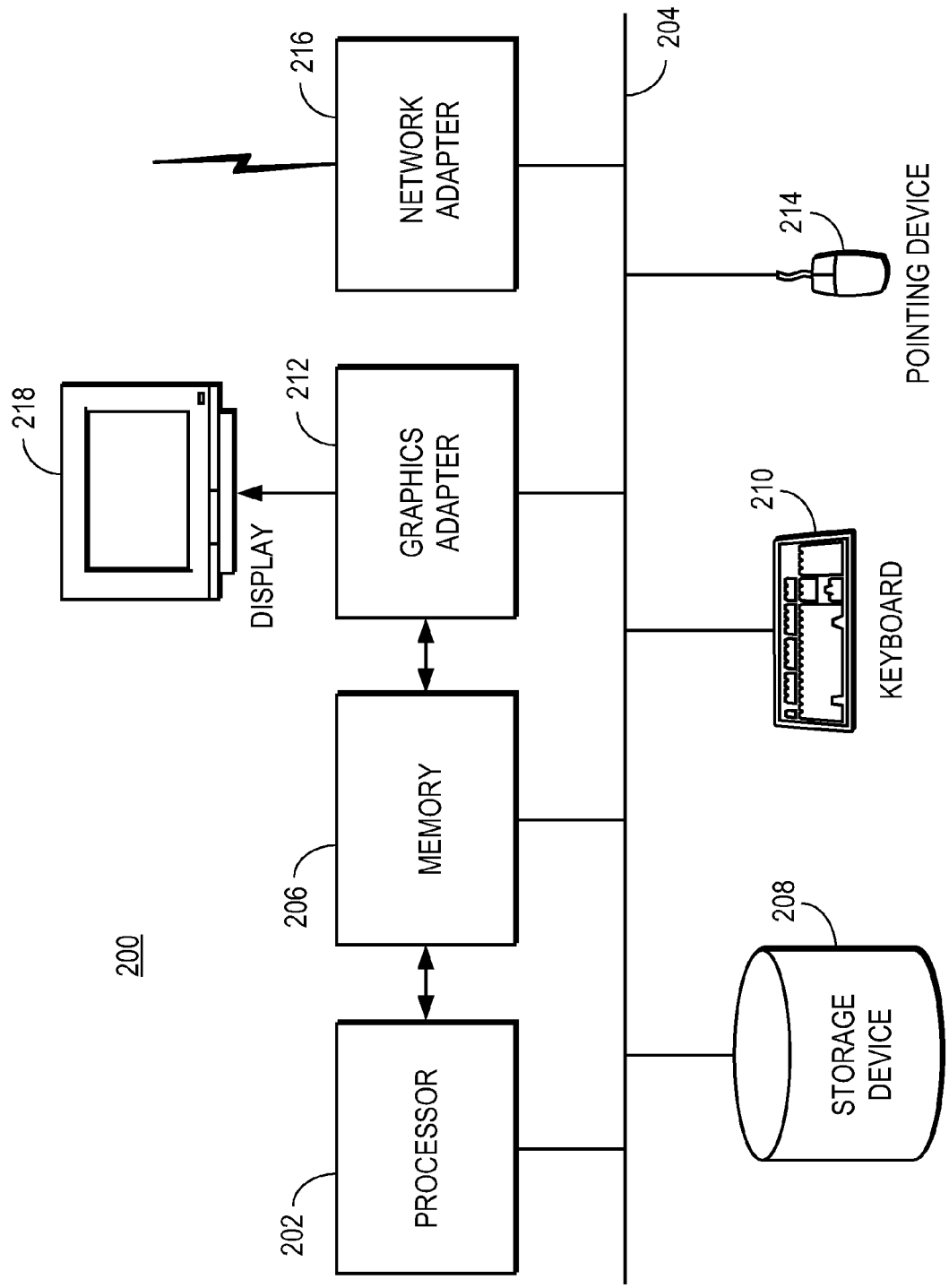
FIG. 2 is a high-level block diagram illustrating a typical computer for use as a reputation server, client, and/or web server providing a web site.

FIG. 2 is a high-level block diagram illustrating a typical computer 200 for use as a reputation server 110, client 112, and/or web server providing a web site 118. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computers 200 utilized by the entities of FIG. 1 can vary depending upon the embodiment and the processing power utilized by the entity. For example, a client 112 that is a mobile telephone typically has limited processing power, a small display 218, and might lack a pointing device 214. The reputation server 110, in contrast, may comprise multiple blade servers working together to provide the functionality described herein.

Figure 3:
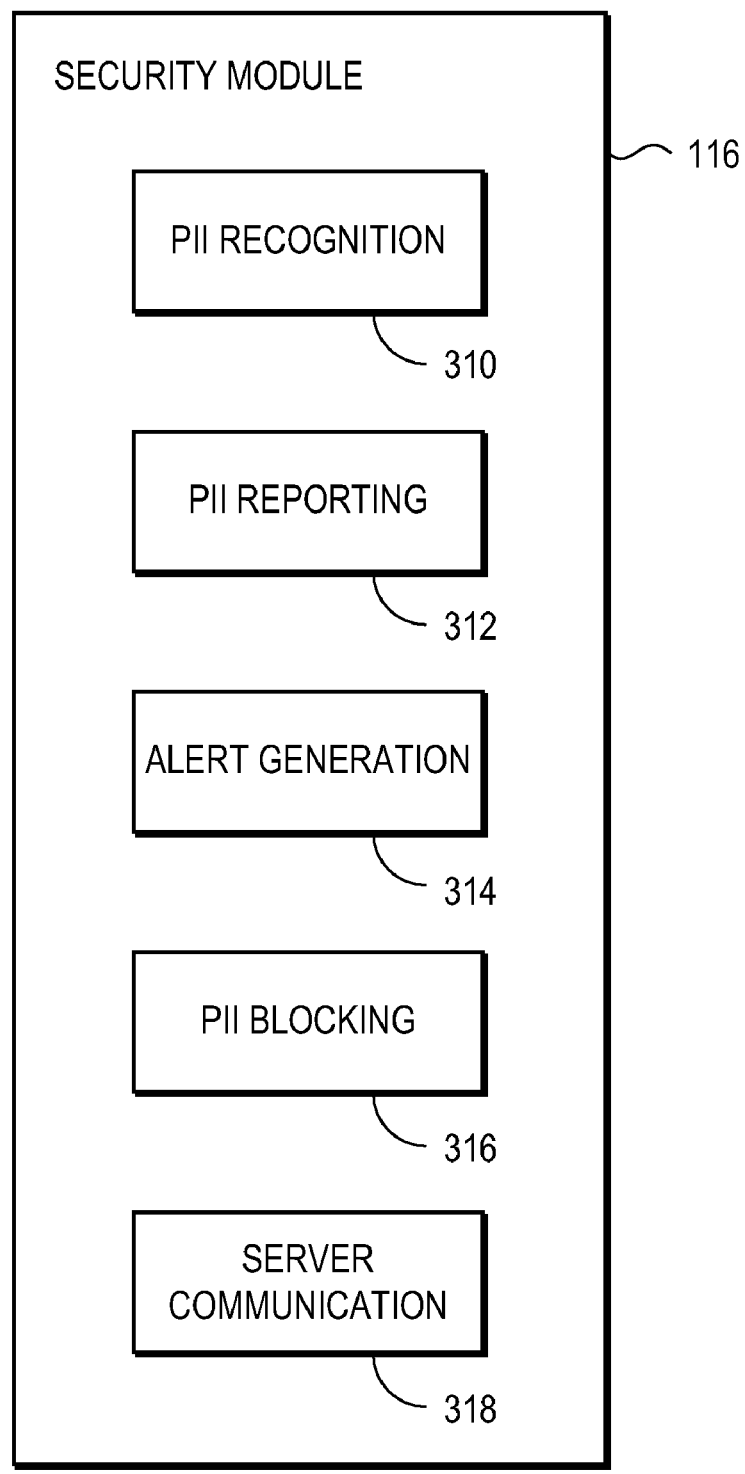
FIG. 3 is a high-level block diagram illustrating a detailed view of the security module of a client according to one embodiment.

FIG. 3 is a high-level block diagram illustrating a detailed view of the security module 116 of a client 112 according to one embodiment. In some embodiments the security module 116 is incorporated into an operating system executing on the client 112 while in other embodiments the security module is a standalone application or part of another product. As shown in FIG. 3, the security module 116 itself includes multiple modules. Those of skill in the art will recognize that other embodiments of the security module 116 can have different and/or other modules than the ones described here, and that the functionalities can be distributed among the modules in a different manner.

A PII recognition module 310 detects when a client submits, or attempts to submit, PII to a web site 118. In one embodiment, the PII recognition module 310 includes a component instantiated as a browser helper object that integrates into the client's web browser to monitor browsing. In another embodiment, the PII recognition module 310 includes a component instantiated as a web proxy. An embodiment of the PII recognition module 310 initially queries the user of the client 112 for various types of PII. The PII recognition module 310 saves the PII provided by the user in response to the query in a secure storage, such as an encrypted region on the storage device 208 of the client 112.

The PII recognition module 310 observes activities performed on the client 112 to determine whether the activities involve the previously-provided PII. For example, an embodiment of the PII recognition module 112 monitors data submitted into fields of web pages to determine whether the data contains PII. Similarly, an embodiment of the PII recognition module 112 monitors network traffic leaving the client 112 and detects if the traffic contains PII. Some embodiments of the PII recognition module 310 detect PII using heuristics and/or other techniques, such as using pattern matching to detect when information submitted into a field represents a possible credit card or social security number.

A PII reporting module 312 reports to the reputation server 110 when the client 112 makes submissions and/or attempted submissions of PII to web sites 118. In one embodiment, the PII reporting module 312 receives a notification from the PII recognition module 310 when a user enters PII into a field of a web page. Upon receiving such notification, the PII reporting module 312 marks the current browser window and its associated threads as containing PII. If a marked browser window or thread initiates a communication to a web site 118, the PII reporting module 312 reports information about the communication to the reputation server 110.

In one embodiment, the PII reporting module 312 reports the following information to the reputation server 110: 1) The URL of the web site to which the PII is being submitted; 2) the type(s) of PII being submitted, such as whether the PII is a credit card number, account number, password, social security number, or maiden name; and 3) a unique identifier (ID) for the client 112. In one embodiment, the client ID is provided by the reputation server 110 when the security module 116 is installed on the client. Other embodiments report different and/or additional information to the reputation server 110.

An alert generation module 314 receives reputation scores for web sites 118 to which the user is attempting to submit PII. If the reputation score for a given web site 118 is low, the alert generation module 314 displays an alert message warning the user of the site's poor reputation. In one embodiment, the alert generation module 314 monitors the web browsing performed on the client 112. Each time the user visits a new web site 118, the alert generation module 314 contacts the reputation server 110 and obtains the reputation score for that site.

If the reputation score is low, the alert generation module 314 displays an alert warning the user that it is inadvisable to provide PII to the current site 118. In another embodiment, to reduce the number of alerts to the user, the alert generation module 314 waits for the user to enter PII into a page from the site 118. If the site's reputation score is low, the alert generation module 314 displays an alert warning the user that it is inadvisable to enter PII and offers to block transmission of the PII. Other embodiments of the alert generation module 314 display alerts and/or offer to block submission of PII at different times.

In one embodiment, the alert generation module 314 alerts the user when the user attempts to submit PII to a site 118 with a lower reputation score than other sites to which the user has submitted the same PII. Each time the user chooses to submit the PII to a web site 118, the alert generation module 314 obtains the reputation of the site from the reputation server 110 and stores a tuple containing the submitted PII and the web site's reputation score in the secure storage. If, at a later time, the user attempts to submit the same PII to a web site 118 having a lower reputation score, the alert generation module 314 generates an alert notifying the user that the web site has lower reputation score than other sites that have received the same PII and offering to block the submission. The user might decide to submit different PII based on this alert. This type of alerting is useful because users often submit the same PII (e.g., passwords) to multiple web sites 118. Upon receiving the alert, the user might decide to submit different PII to the site 118 having the lower reputation score.

The reputation scores that trigger alerts and the types of alerts generated by the alert generation module 314 can vary in different embodiments. In one embodiment, the alert generation module 314 generates an alert if the reputation score is below a threshold. The threshold can be set by the user, the security module 116 and/or the reputation server 110 depending upon the embodiment.

The types of alerts generated by the alert generation module 314 can include visible and/or audible alerts. For example, the alert can be a dialog box that presents a message to the user such as "This web site has a bad reputation. Are you sure you want to submit PII to it?" The dialog box can include a set of "Yes/No" or "OK/Cancel" buttons that let the user cancel or confirm submission of the PII. The alert can also be a graphical icon describing the reputation score of the web site. For example, a red icon can indicate that the site has a low reputation score while a green icon can indicate that the site has a high reputation score. Further, some embodiments display the actual reputation score to the user while other embodiments provide a representation of the risk presented by the reputation score.

A PII blocking module 316 selectively blocks submission of PII to web sites 118. In one embodiment, the PII blocking module 316 is activated when the user responds to a notification from the alert generation module 314 by choosing to block submission of the PII. The PII blocking module 316 can also activate in other situations. An embodiment of the PII blocking module 314 includes or interacts with a firewall that selectively blocks network traffic outbound from the client 112.

A server communication module 318 at the client 112 communicates with the reputation server 110 via the network 114. In one embodiment, the server communication module 318 sends the reports from the PII reporting module 312 to the server 110. In addition, an embodiment of the server communication module 318 receives reputation scores and/or other information from the reputation server 110.

Figure 4:
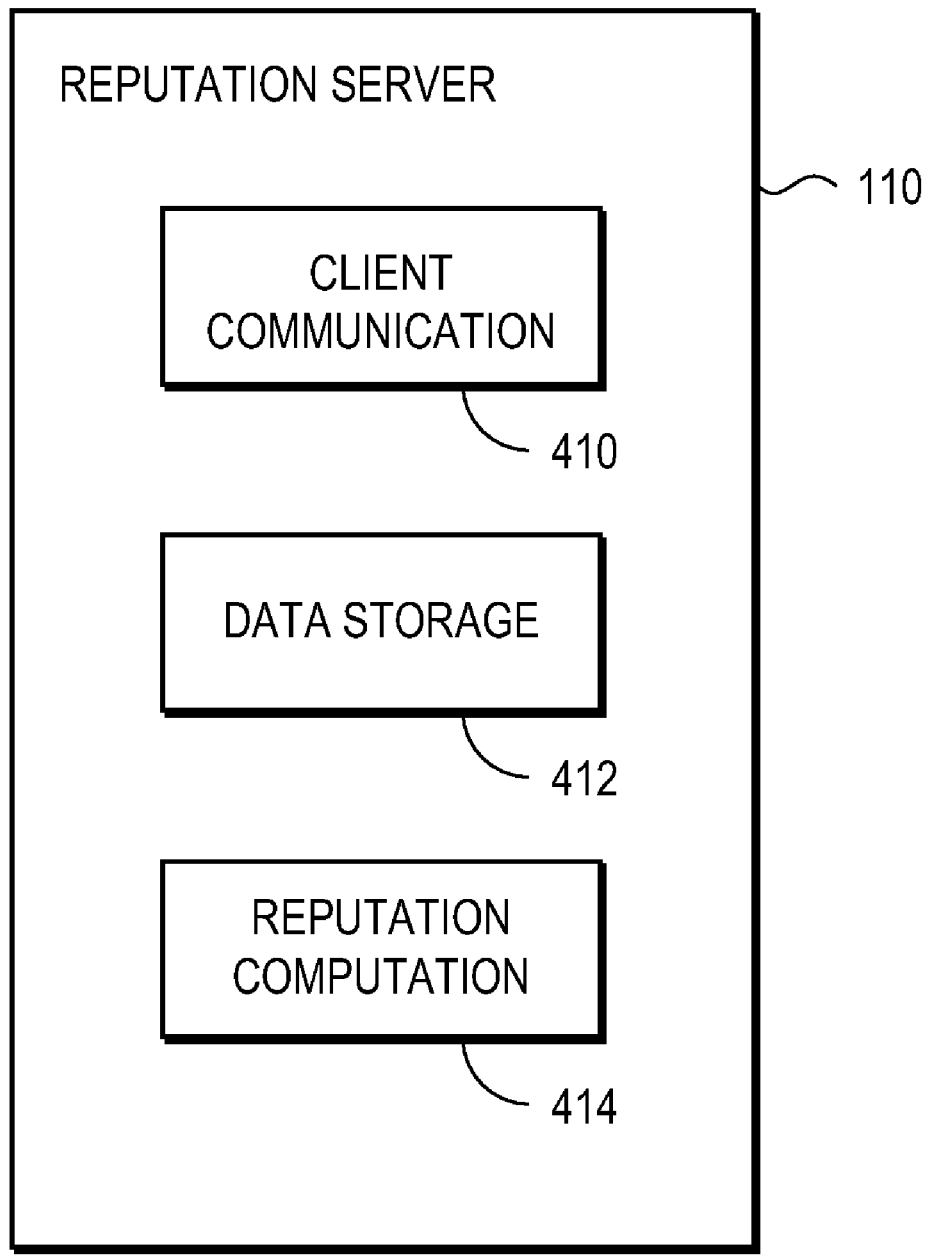
FIG. 4 is a high-level block diagram illustrating a detailed view of the reputation server according to one embodiment.

FIG. 4 is a high-level block diagram illustrating a detailed view of the reputation server 110 according to one embodiment. In one embodiment, the reputation server 110 is operated by the same entity that provides the security modules 116 to the clients 112. As shown in FIG. 4, the reputation server 110 includes several modules. Those of skill in the art will recognize that other embodiments of the reputation server 110 can have different and/or other modules than the ones described here, and that the functionalities can be distributed among the modules in a different manner. In addition, the functions ascribed to the reputation server 110 can be performed by multiple servers.

A client communication module 410 at the reputation server 110 communicates with the clients 112 via the network 114. In one embodiment, the client communication module 410 receives submissions from clients 112 describing URLs of web sites 118 to which the clients submitted PII, the type of PII that the clients sent to the sites, and the unique IDs of the clients. Further, an embodiment of the client communication module 410 provides clients 112 with reputation scores for web sites 118.

A data store module 412 stores the submissions that the client communication module 410 receives from the clients 112. Thus, the data store module 412 stores data describing the web sites 118 that have been visited by the clients 112 and the types of PII that the clients submitted to the web sites. In one embodiment, the data store module 412 stores the following information for each web site (as identified by the site's URL): the total number of distinct users that have submitted each type of PII to this URL; the types of PII submitted to (i.e., requested by) this particular URL; a timestamp indicating the time and date of first submission of each category of PII to this URL; and a list of the last X submissions (e.g., the unique IDs, timestamps, and/or other information) to this URL, where X is an integer value. The list of the last X submissions is used to detect and/or prevent spoofing and resubmission attackers. Other embodiments store different and/or additional information for each web site 118. In addition, some embodiments of the data store module 412 store other data used by the reputation server 110, such as reputation and hygiene scores.

A reputation computation module 416 computes reputation scores for web sites 118 based on the PII submission data stored by the data store module 412. Generally, the more PII submissions a web site 118 receives, the higher the reputation score the reputation computation module 416 computes for that site. For example, the reputation computation module 416 computes a higher reputation score for a web site 118 that receives credit card numbers from many different clients 112 than for a site that receives credit card numbers from relatively few clients.

In some embodiments, the reputation computation module 416 assigns greater weight (i.e., influence) to certain types of PII submissions than to others. For example, a site 118 that receives submissions of PII that most people consider highly-confidential, such as social security numbers, is probably trustworthy with respect to social security numbers and other types of PII. In contrast, a site that receives PII that many people do not consider confidential, such as email addresses, is not necessarily trustworthy with respect to more confidential types of PII. Therefore, an embodiment of the reputation computation module 416 computes a higher reputation score for a site 118 that receives social security numbers than for a site that receives primarily email addresses, even if the two sites have received approximately the same number of PII submissions.

In some embodiments, the reputation computation module 416 assigns a site 118 different reputation scores for different types of PII. Thus, a site 118 that receives many email address submissions receives a high reputation score with respect to email addresses. However, the same site might receive a lower reputation score with respect to social security numbers. Different reputation scores for different types of PII are useful when a web site 118 that normally accepts one type of PII is compromised and configured to ask for other types of PII data. For example, a site 118 that normally accepts email addresses might be compromised by a malicious attacker and configured to also ask for credit card numbers. The reputation computation module 416 would properly assign the site a high reputation score for email addresses, and a low reputation score for credit card numbers, thus allowing the client-side security module 116 to generate an alert and block a credit card number submission.

In one embodiment, the reputation computation module 416 assigns a low reputation score to a new web site 118. Such sites are identified as having young (i.e., recent) timestamps in the data store module 412. The site's reputation score increases over time as it receives more PII submissions. Again, the reputation scores assigned based on the age of the site can differ for different types of PII. Thus, a site that is considered "old" for some types of PII might be considered "young" for other types of PII.

Figure 5:
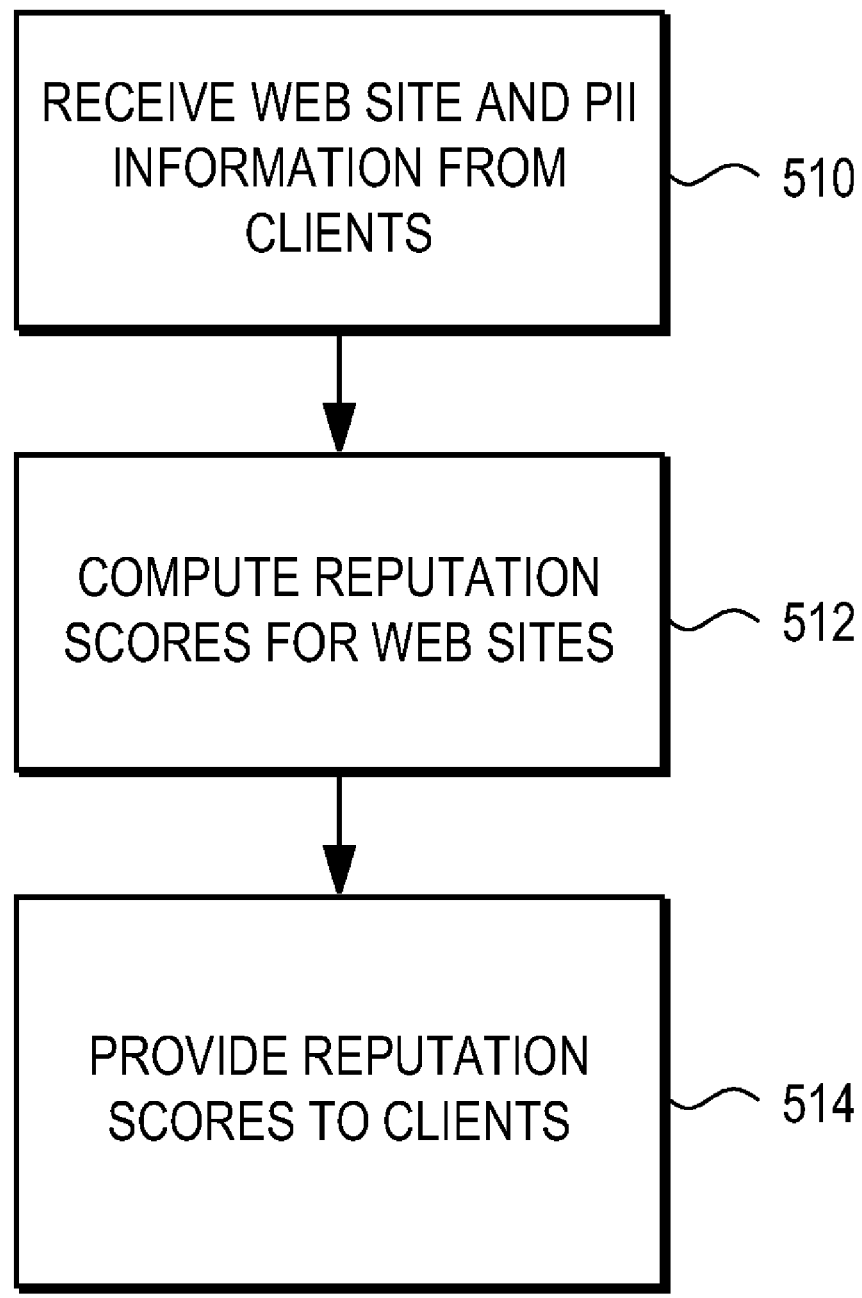
FIG. 5 is a flowchart illustrating steps performed by the reputation server to provide reputation scores for web sites to clients according to one embodiment.

FIG. 5 is a flowchart illustrating steps performed by the reputation server 110 to provide reputation scores for web sites 118 to clients 112 according to one embodiment. Other embodiments perform the illustrated steps in different orders, and/or perform different or additional steps. Moreover, some or all of the steps can be performed by entities other than the reputation server 110. Those of skill in the art will recognize that embodiments of the reputation server 110 simultaneously communicate with multiple clients 112 and compute reputation scores for multiple sites 118. Therefore, embodiments of the reputation server 110 may perform multiple instances of the steps of FIG. 5 simultaneously.

The reputation server 110 receives 510 information about PII submissions to web sites 118 made by the clients 112. In one embodiment, the received information includes the URL of the web site 118 to which the PII was sent, the type(s) of PII sent, and a unique ID for the client 112. The reputation server 110 computes 512 one or more reputation scores for the web sites 118. As mentioned above, in some embodiments the reputation score for a given site 118 is based on the amount and types of PII submitted to the site by the clients 112. A given site 118 can also receive different reputation scores for different types of PII. The reputation server 110 provides 518 the reputation scores for web sites 118 to the clients 112. For example, the reputation server 110 may provide the reputation score for a given site in response to a request from a client 112.

Figure 6A:
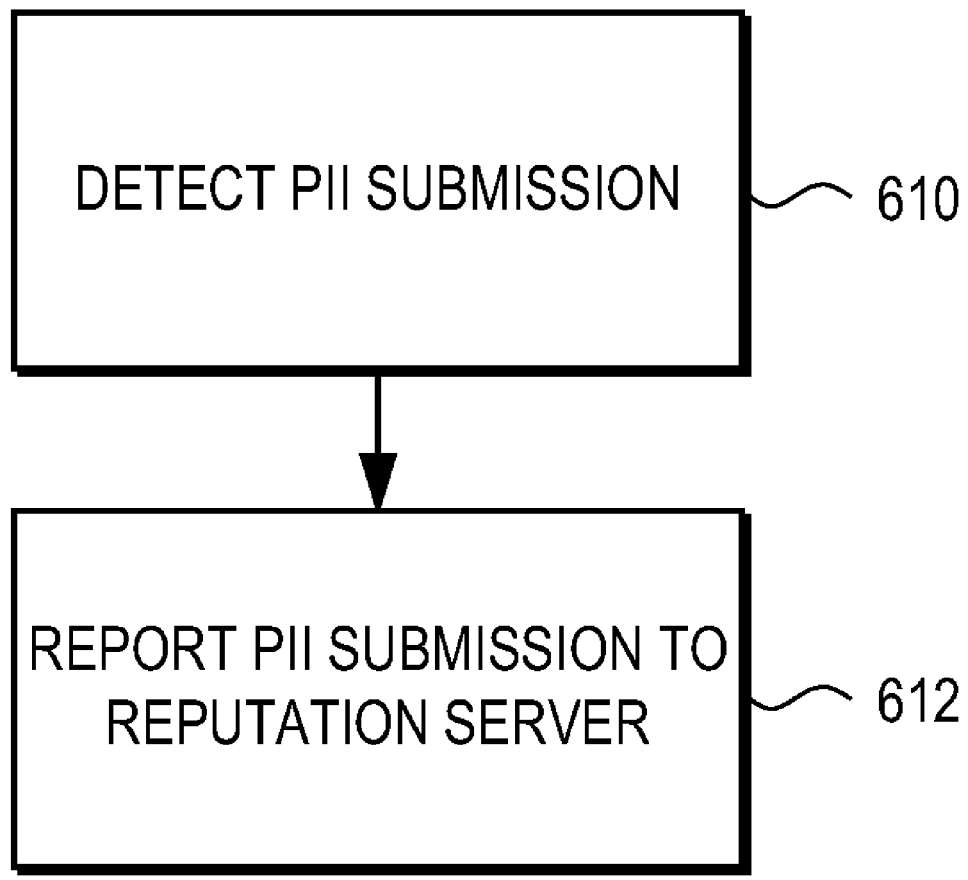
FIG. 6A is a flowchart illustrating steps performed by the security module in the client to report a PII submission to the reputation server according to one embodiment.

FIG. 6A is a flowchart illustrating steps performed by the security module 116 in the client 112 to report a PII submission to the reputation server 110 according to one embodiment. Other embodiments perform the illustrated steps in different orders, and/or perform different or additional steps. Moreover, some or all of the steps can be performed by entities other than the security module 116.

The security module 116 detects 610 when the client 112 submits PII to a web site 118. In one embodiment, the security module 116 monitors web traffic exiting the client 112 and identifies traffic that contains PII. Upon detecting a PII submission to a web site, the security module 116 reports 612 the PII submission to the reputation server 110. In one embodiment, the security module 116 reports this submission by sending a message to the reputation server 110 that identifies the web site 118 that received the PII, the type of PII sent to the site, and a unique ID of the client 112.

Figure 6B:
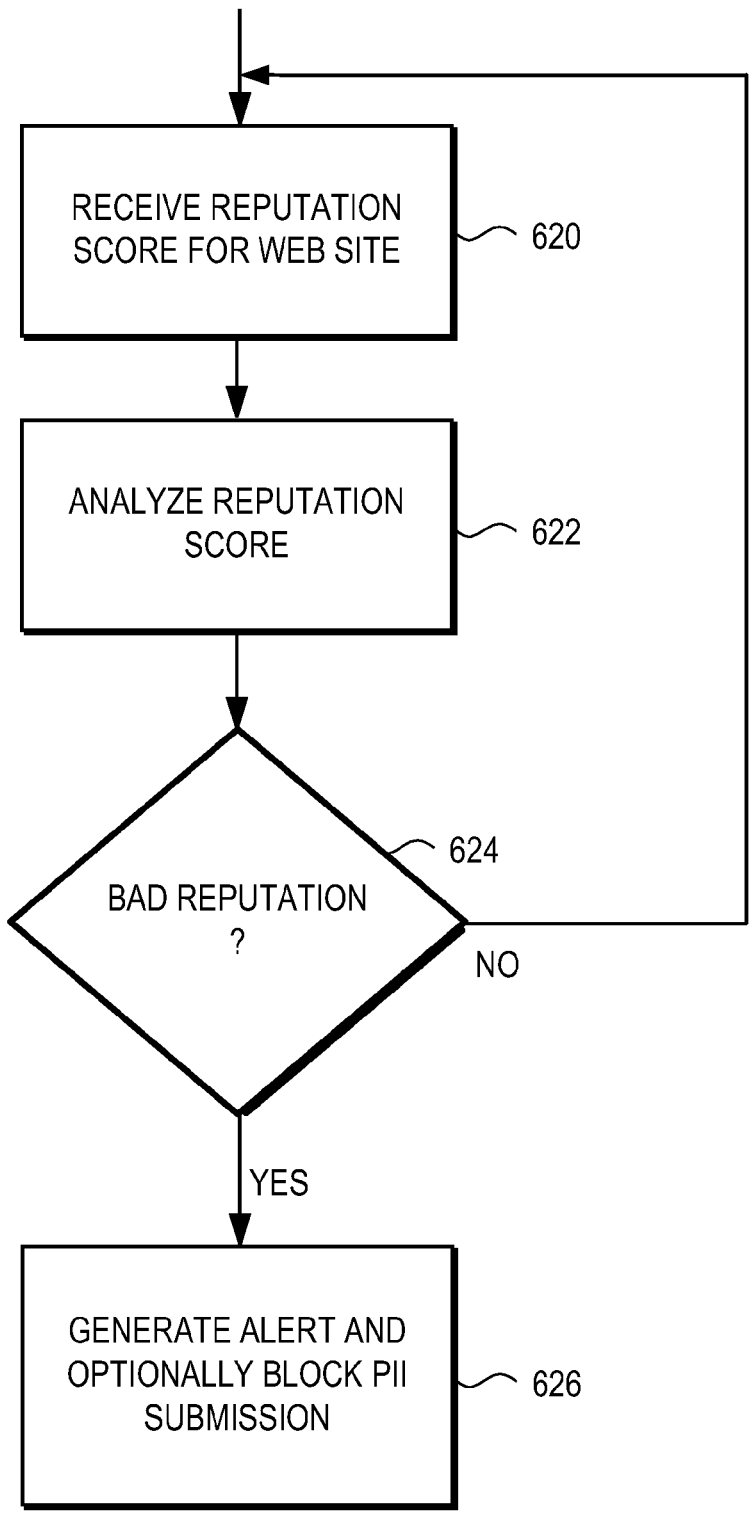
FIG. 6B is a flowchart illustrating steps performed by the security module to evaluate a reputation score for a web site received from the reputation server according to one embodiment.

FIG. 6B is a flowchart illustrating steps performed by the security module 116 to evaluate a reputation score for a web site 118 received from the reputation server 110 according to one embodiment. Other embodiments perform the illustrated steps in different orders, and/or perform different or additional steps. Moreover, some or all of the steps can be performed by entities other than the security module 116.

The security module 116 receives 620 a reputation score for a web site 118 from the reputation server 110. In one embodiment, the security module 116 detects when the client 112 browses to a web site 118 and requests the reputation score for the site from the reputation server 110 in response to the browsing activity. In another embodiment, the security module 116 detects when the client 112 chooses to submit PII to a web site 118 and requests the reputation score for the site in response to the submission. The client 112 receives 620 the reputation score for the web site 118 in response to the request.

The security module 116 analyzes 622 the reputation score to determine whether the associated web site has a good or bad reputation. Generally, a high reputation score means the web site 118 has a good reputation and can be trusted with PII while a low reputation score means the web site 118 has a bad reputation (and/or is a new site) and might be untrustworthy. The reputation score and analysis 622 can be specific to a given type of PII. For example, a site 118 can have a high reputation score for email addresses but a low reputation score for credit card numbers.

If 624 the web site 118 has a good reputation, an embodiment of the security module 116 allows any submissions and/or other transactions to proceed without generating an alert. If 624, on the other hand, the site 118 has a bad reputation, an embodiment of the security module 116 generates 626 an alert and optionally blocks the submission of PII to the site. The alert can be generated at different times depending upon the embodiment. For example, one embodiment generates 626 the alert when the site 118 is first accessed, while another embodiment generates the alert only if the client 112 attempts to submit PII to the site. In one embodiment, the security module 116 generates 626 the alert when the client 112 attempts to submit PII to a web site 118 and that site has a lower PII score for that PII than other sites to which the client 112 has submitted it. For example, the security module 116 generates 626 the alert if the client attempts to submit a password to a site 118 that has a lower reputation score than other sites to which the client has submitted the password.

In one embodiment, the security module 116 at the client 112 and/or the reputation server 110 also considers a hygiene score of the client 112 when determining and/or analyzing reputation scores for web sites 118. The hygiene score of a client 112 generally corresponds to the user of the client's propensity to submit PII to untrustworthy sites. A user that tends to submit PII to sites having low reputation scores receives a low hygiene score. The hygiene score can also be based on other behaviors of the user and/or characteristics of the client 112, such as the number of malware detections on the client, and/or the frequency with which the user downloads files from untrustworthy web sites 118.

In one embodiment, the security module 116 monitors the client 112 and computes the client's hygiene score. The security module 116 reports the hygiene score to the reputation server 110. For example, an embodiment of the security module 116 reports the hygiene score at the same time it reports 612 a PII submission to the reputation server 110. The security module 110, in turn, considers the clients' hygiene scores when computing the reputation score for a web site 118. A web site 118 that receives PII from clients having high hygiene scores receives a boosted reputation score. In contrast, a web site 118 that predominately receives PII from clients having low hygiene scores receives a decreased reputation score. Additional information about determining and using hygiene scores is found in U.S. patent application Ser. No. 11/692,469, which is hereby incorporated herein by reference.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A method of providing computer security, comprising: using a computer to perform steps comprising:
   receiving data describing personally identifiable information (PII) submitted to a web site by a plurality of clients;
   receiving data describing hygiene scores of the plurality of clients that have submitted the PII to the web site, wherein a hygiene score of a client indicates the client's propensity to submit the PII to untrustworthy web sites;
   determining a number of clients that have submitted the PII to the web site;
   computing a reputation score for the web site responsive at least in part to the number of clients that have submitted the PII to the web site and the hygiene scores of the plurality of clients that have submitted the PII to the web site, the reputation score representing an assessment of the trustworthiness of the web site, the website receiving a higher reputation score than a second web site based on a determination that the web site has received the PII from a larger number of clients than has the second web site; and
   providing the reputation score to a client.

2. The method of claim 1, wherein receiving data describing the PII submitted to the web site comprises:
   receiving data describing a uniform resource locator (URL) referencing the web site; and
   receiving data describing one or more types of PII submitted to the web site.

3. The method of claim 1, wherein receiving data describing the PII submitted to the web site comprises:
   receiving separate submissions from each of the plurality of clients, each submission describing one or more types of PII submitted to the web site by the client.

4. The method of claim 1, wherein there are a plurality of types of PII that the plurality of clients can submit to the web site and wherein computing a reputation score for the web site comprises:
   determining a number of distinct clients that have submitted a specified type of PII of the plurality of types of PII to the web site;
   determining times of submission of the specified type of PII to the web site; and
   computing a reputation score for the web site responsive at least in part to the specified type of PII, the number of distinct clients that have submitted the specified type of PII to the web site, and the times of submission of the specified type of PII to the web site.

5. The method of claim 4, wherein different reputation scores are computed for the web site with respect to different types of PII.

6. The method of claim 1, further comprising:
receiving the reputation score for the web site at the client;
analyzing the reputation score for the web site to determine whether the web site is trustworthy; and
responsive to a determination that the web site is not trustworthy, generating an alert at the client indicating that the site is not trustworthy.

7. A computer-implemented system for providing computer security, comprising:
a computer processor; and
a computer-readable storage medium storing computer program modules configured to execute on the computer processor, the computer program modules comprising:
a communication module configured to:
receive data describing personally identifiable information (PII) submitted to a web site by a plurality of clients;
receive data describing hygiene scores of the plurality of clients that have submitted the PII to the web site, wherein a hygiene score of a client indicates the client's propensity to submit the PII to untrustworthy web sites; and
provide a computed reputation score for the web site to clients; and
a reputation computation module configured to:
determine a number of clients that have submitted the PII to the web site; and
compute the reputation score for the web site responsive at least in part to the number of clients that have submitted the PII to the web site and the hygiene scores of the plurality of clients that have submitted the PII to the web site, the reputation score representing an assessment of the trustworthiness of the web site, the website receiving a higher reputation score than a second web site based on a determination that the web site has received the PII from a larger number of clients than has the second web site.

8. The computer-implemented system of claim 7, wherein a higher reputation score indicates that the web site is more trustworthy and wherein the reputation computation module is further configured to:
determine a number of distinct clients that have submitted a specified type of PII of the plurality of types of PII to the web site; and
compute a reputation score for the web site responsive at least in part to the specified type of PII and the number of distinct clients that have submitted the specified type of PII to the web site.

9. A computer program product having a non-transitory computer-readable storage medium storing computer-executable code for providing computer security to a client, the code comprising:
a communication module configured to receive, from a reputation server on a network, a reputation score for a web site on the network, the reputation score representing an assessment of the trustworthiness of the web site and computed based at least in part on a number of clients that have submitted personally identifiable information (PII) to the web site and hygiene scores of the plurality of clients that have submitted PII to the web site, wherein hygiene scores of the clients indicate the clients' propensities to submit the PII to untrustworthy web sites, the web site receiving a higher reputation score than a second web site based on a determination that the web site has received the PII from a larger number of clients than has the second web site; and
an alert generation module configured to analyze the reputation score for the web site to determine whether the web site is trustworthy and, responsive at least in part to a determination that the web site is not trustworthy, generate an alert at the client indicating that the web site is not trustworthy.

10. The computer program product of claim 9, the code further comprising:
a PII recognition module configured to monitor client browsing of web sites on the network and detect if the client has browsed to the web site;
wherein the alert generation module is further configured to generate the alert indicating that the web site is not trustworthy responsive to detecting that the client has browsed to the web site.

11. The computer program product of claim 9, the code further comprising:
a PII recognition module configured to detect an attempted submission of PII to the web site;
wherein the alert generation module is further configured to generate the alert indicating that the web site is not trustworthy responsive to the detected attempted submission of PII to the web site.

12. The computer program product of claim 11, the code further comprising:
a PII blocking module configured to block the attempted submission of PII to the web site.

13. The computer program product of claim 9, the code further comprising:
a PII recognition module configured to detect an attempted submission of PII from the client to the web site;
wherein the alert generation module is further configured to:
compare the reputation score for the web site to the reputation scores of other web sites to which the client has submitted the same PII to determine whether the web site is less trustworthy than the other web sites; and
generate an alert at the client responsive to a determination that the web site is less trustworthy than the other web sites to which the client has submitted the same PII.

14. The computer program product of claim 9, the code further comprising:
a PII recognition module configured to detect a submission of PII from the client to the web site; and
a PII reporting module configured to report the submission of PII to the reputation server responsive at least in part to detecting the submission of PII.

15. The computer program product of claim 14, wherein the PII reporting module is further configured to:
send a report to the reputation server, the report identifying the web site to which the PII was submitted and specifying a type of PII that was submitted.

16. The computer program product of claim 14, wherein the PII reporting module is further configured to:
send a report to the reputation server, the report identifying the web site to which the PII was submitted, specifying a type of PII that was submitted, and specifying a hygiene score for the client, the hygiene score of the client indicating the client's propensity to submit PII to untrustworthy web sites.

* * * * *